United States Patent [19]

Shimer et al.

[11] 3,713,504
[45] Jan. 30, 1973

[54] VEHICLE ELECTRIC DRIVE PROVIDING REGULATION OF DRIVE WHEEL OPERATING SPEED DIFFERENCE

[75] Inventors: Daniel W. Shimer, Warren; Jalal T. Salihi, Birmingham, both of Mich.

[73] Assignee: General Motors Corporation, Detroit, Mich.

[22] Filed: May 26, 1971

[21] Appl. No.: 146,886

[52] U.S. Cl. ............... 180/65 R, 105/35, 290/14, 318/52, 318/78, 318/148
[51] Int. Cl. ............................................. B60l 11/08
[58] Field of Search ....... 180/65 R, 44 E; 318/52, 78, 318/148; 290/14; 105/35, 61

[56] References Cited

UNITED STATES PATENTS

| 2,581,596 | 1/1952 | Nims | 180/65 R |
| 3,263,142 | 7/1966 | Adoutte et al. | 290/14 X |
| 3,323,032 | 5/1967 | Agarwal et al. | 318/227 X |
| 3,551,685 | 12/1970 | Corry | 290/14 |
| 3,561,557 | 2/1971 | Magnuson | 180/65 A |
| 3,577,050 | 5/1971 | Ringland et al. | 318/148 |
| 3,611,104 | 10/1971 | Jalal et al. | 321/2 |
| 3,659,168 | 4/1972 | Salihi et al. | 290/14 X |

Primary Examiner—Benjamin Hersh
Assistant Examiner—Milton L. Smith
Attorney—E. W. Christen and C. R. Meland

[57] ABSTRACT

A vehicle electric drive system includes two electric power supplies connected respectively to energize front and rear drive AC induction motors to propel front and rear sets of drive wheels through respective front and rear differentials. The AC voltages supplied the motors are comprised of substantially rectangular voltage pulses of alternating polarity. The operating speeds of the two motors are sensed and compared to ascertain whether the difference in operating speeds exceeds a predetermined amount. If the sensed operating speed difference is in excess of a predetermined value, the width of the voltage pulses supplied the motor operating at the higher speed is reduced to reduce the level of the voltage supplied that motor, thus reducing its speed to ensure that the front and rear sets of drive wheels are operated with a controlled maximum speed difference.

2 Claims, 7 Drawing Figures

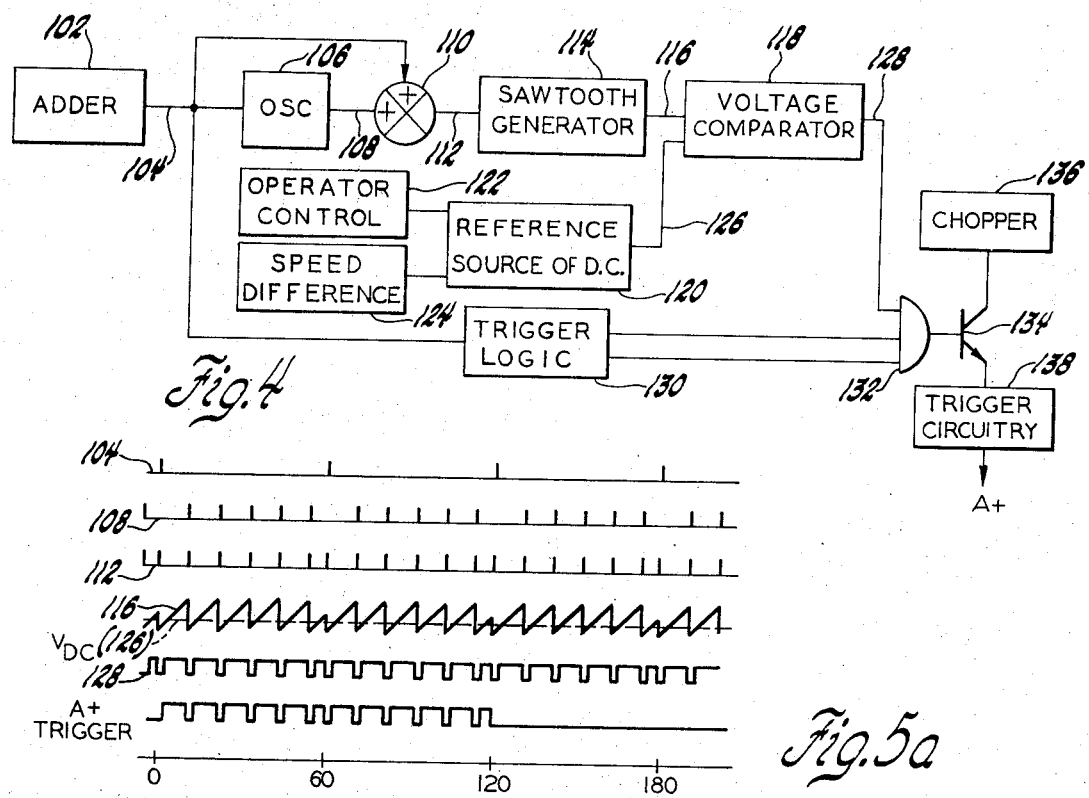
Fig.4
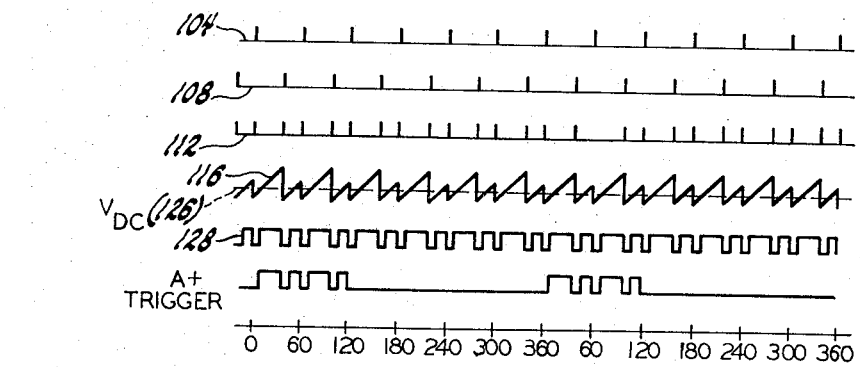
Fig.5a
Fig.5b
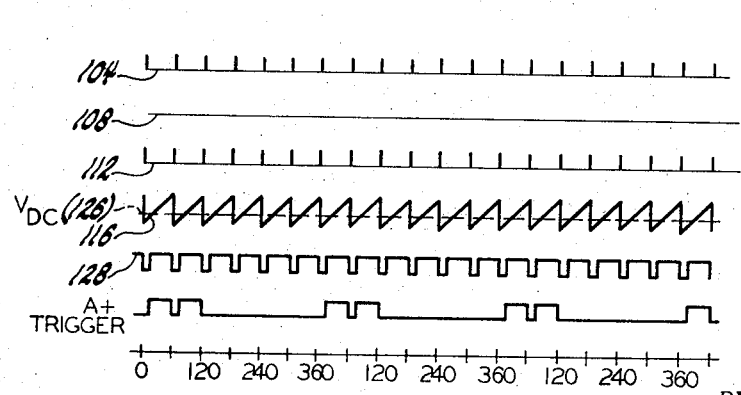
Fig.5c
INVENTORS
Daniel W. Shimer &
BY Jalal T. Salihi
C.R. Meland
ATTORNEY

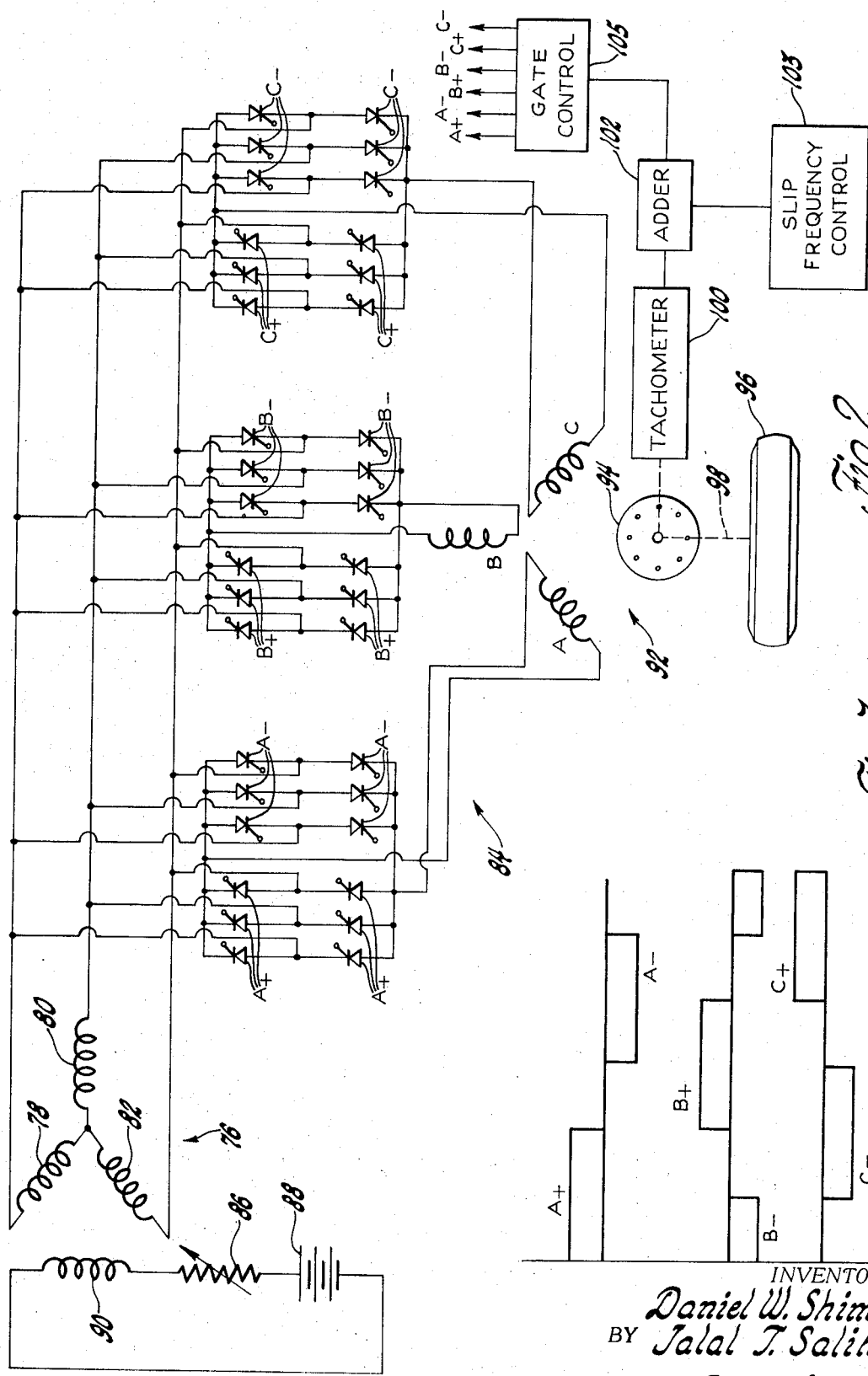

VEHICLE ELECTRIC DRIVE PROVIDING REGULATION OF DRIVE WHEEL OPERATING SPEED DIFFERENCE

This invention relates to an electric drive system for a vehicle including provision to regulate the speed difference between front and rear sets of drive wheels.

In conventional earth moving equipment, such as a scraper, front and rear drive wheels are powered by two identical diesel engines. Operator control of the diesel engines is effected through two accelerator pedals. In this manner, the operator achieves maneuverability and compensates for operating conditions, such as wheel slip.

Performance of earth moving equipment, as measured by the torque available at the wheels, is affected by wheel slip; tire wear is also determined, at least in part, by wheel slip. In the conventional diesel drive, the operator performs as a servo control, sensing wheel slip and adjusting accelerator pressure to optimize performance by minimizing wheel slip. Electric drive systems afford automatic control of wheel slip. One approach, in an electric drive, to monitoring wheel slip is the provision of a free running fifth wheel as a reference source and regulation of drive wheels in relation to the speed of the reference wheel. Another approach is to measure the speed of all drive wheels and obtain an average with control in relation to this average speed. The present invention contemplates an automatic closed loop control in which the speed of each of the front and rear drive AC induction motors is compared with the speed of the other drive motor with means for making an adjustment in the voltage supplied one of the drive motors if the speed difference between the two exceeds a predetermined amount.

In the vehicle electric drive of the present invention, a prime mover driven alternator supplies power to two frequency changers for connection, respectively, to two drive AC induction motors. These two drive motors are connected, respectively, through front and rear differentials with front and rear sets of drive wheels. Each drive motor is supplied an AC voltage comprised of a plurality of substantially rectangular pulses, having controllable pulse widths, in each half cycle. Thus, adjustments in the voltage levels of the two induction motors are readily made by adjusting the pulse widths of the voltages from the frequency changers. According to the present invention, a reduction in the pulse widths of the voltage supplied speed whenever the sensed difference in operating speeds of the two drive motors exceeds a predetermined maximum amount.

Accordingly, it is an object of the present invention to provide a vehicle electric drive of the type described including front and rear drive systems energized by front and rear frequency changers wherein the operating speeds of the front and rear drive motors are sensed and an adjustment is made to reduce the voltage supplied the drive motor operating at the higher speed if the sensed speed difference of the two drive motors exceeds a predetermined amount.

Another object of the present invention is to provide a vehicle electric drive including a prime mover driven alternator connected with front and rear frequency changers to supply front and rear drive AC induction motors to power front and rear sets of drive wheels through front and rear differentials wherein the operating speeds of the motors are continually sensed and wherein the difference in operating speeds of the two motors is controlled by reducing the voltage level of the motor operating at the higher speed while maintaining the voltage level of the motor operating at the lower speed if the difference in operating speeds of the two motors exceeds a predetermined amount.

Another object of the present invention is to provide a vehicle electric drive of the type described to regulate the difference in operating speeds of the front and rear sets of drive wheels of a vehicle including offset or calibration provision to regulate the predetermined maximum operating speed difference and including provision to calibrate the rate of voltage adjustment to the motor operating at the higher speed as a function of the operating speed difference in excess of the predetermined maximum.

These and other objects and advantages of the present invention will be apparent in light of the following description wherein the figures listed below are incorporated as illustrating a preferred embodiment.

FIG. 2 is a schematic diagram, partially in block form, illustrating in greater detail one of the cycloconverter frequency changers with controls required in FIG. 1.

FIG. 3 is a graph of the voltages available from the cycloconverter of FIG. 2 during full voltage operation.

FIG. 4 is a block diagram of gate firing circuitry included in the cycloconverter of FIG. 2 to develop the requisite enabling and disabling control to effect duty cycle modulation.

Figure 1:
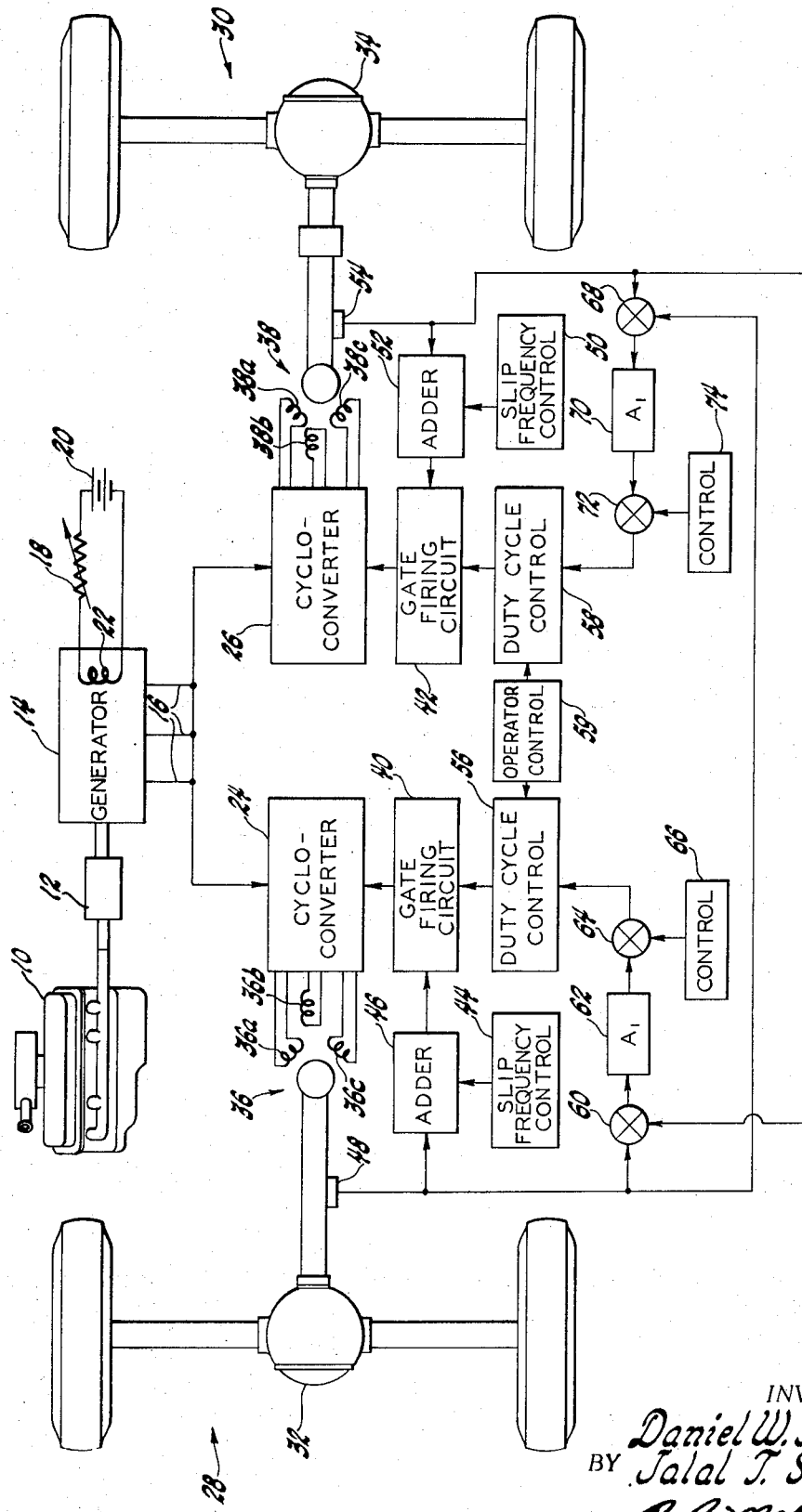
FIG. 1 is a schematic, partially in block form, of the electric drive of the present invention including provision for regulating the difference in operating speeds of drive motors connected with front and rear sets of drive wheels.

FIGS. 5A, 5B, and 5C are timing diagrams depicting the operation of the cycloconverter of FIG. 2 as controlled by the duty cycle modulation circuitry of FIG. 4.

Reference should now be made to FIG. 1 wherein a vehicle electric drive for an earth mover such as a scraper is illustrated embodying speed difference regulation according to the present invention. A prime mover generally illustrated as a diesel engine 10 is mechanically coupled by linkage 12 with an alternator shown as a generator 14 to develop a three-phase AC output voltage on lines 16. A field control circuit shown as a variable resistor 18, a battery 20, and a field winding 22 affords regulation of the voltage level on the output lines 16. This voltage generation system can be operated at a speed providing maximum efficiency for the diesel 10 inasmuch as variation of power to the drive wheels of the vehicle is accomplished by two cycloconverters or frequency changers 24 and 26 connected with the output lines 16. Additionally, the voltage on lines 16 can be varied by the field control circuit.

Front and rear sets of drive wheels 28 and 30 provide the propulsion required to operate the vehicle. These drive wheels are connected through differentials 32 and 34 with respective front and rear drive AC induction motors 36 and 38. The differentials 32 and 34 are of a "no-spin" type such that both drive wheels of either set operate at the same speed. In practice, deviation from the "no-spin" requirement can be accommodated to permit smoother operation during turning.

Each of the induction motors 36 and 38 includes three separate phase windings and a squirrel cage rotor connected with the respective differential. The three windings, 36A, 36B, and 36C, of induction motor 36 are connected with the cycloconverter 24 and the three windings, 38A, 38B, and 38C, of induction motor 38 are connected with the cycloconverter 26. Accordingly, the cycloconverters 24 and 26 determine the frequency of operation and the power level available at the output shafts of the respective front and rear drive motors.

Cycloconverters 24 and 26 include controlled rectifiers as control devices periodically and sequentially switched to regulate the voltages applied to the motor windings. Gate firing circuits 40 and 42 provide the requisite control signals to the controlled rectifiers of cycloconverters 24 and 26, respectively. Each of the gate firing circuits operates at a frequency determined to regulate the slip frequency of the respective induction motor. Slip frequency control 44 and adder 46 provide a control loop with the gate firing circuit 40 to regulate the sequential switching of controlled rectifiers in cycloconverter 24 to provide controlled slip operation of the induction motor 36. This is accomplished according to principles generally known in the art by sensing the operating speed of the rotor of motor 36 and adding the speed frequency signal to a slip frequency control signal and controlling the sequential switching in accordance with the combined signal. A tachometer 48 senses the operating speed of the motor 36 and provides the necessary speed input to the adder 46. A similar control loop is provided for induction motor 38 including a slip frequency control 50, an adder 52, and a tachometer 54 to provide the requisite control for controlled slip operation of induction motor 38. The tachometers 48 and 54 can take a variety of forms generally known in the art providing either a pulse or a DC output for connection with the respective adders. In the preferred embodiment, tachometers 48 and 54 provide pulse train outputs having frequencies related to the respective rotor speeds.

Voltage pulses available from the cycloconverters 24 and 26 to the respective induction motors are substantially rectangular in form during operation. The frequency of alternation in polarity of this voltage waveform is determined by the gate firing circuitry in accordance with the slip frequency control described. Modulation of the width of the rectangular voltage pulses supplied the motors provides regulation of the average voltage to the respective motors. Duty cycle modulation of the voltage pulses to induction motor 36 is provided by the connection of duty cycle control 56 with the gate firing circuit 40. Similarly, duty cycle modulation of the voltage pulses supplied induction motor 38 is provided by the duty cycle control 58 connected with the gate firing circuit 42. In operation, as described more completely hereinafter, a DC control signal is developed in the duty cycle controls 56 and 58 to set the level of voltage supplied the respective motors. In accordance with the present invention, if the operating speed difference of the two motors exceeds a predetermined maximum, an adjustment is made in the DC control signal regulating the voltage of the motor operating at the higher speed to reduce the voltage supplied that motor, reducing its operating speed.

Primary control of the DC control signals of duty cycle controls 56 and 58 is provided by an operator control 59, analogous to the accelerator pedal control of a diesel engine; accordingly, operator control 59 controls the operating power level of the front and rear drive motors. As noted above, the speed of operation of generator 14 can be constant to optimize the operation of the diesel 10, and the operator control 59 is used to regulate the power supplied the motors by controlling the output voltage of the cycloconverters even if the input is maintained constant. In the preferred embodiment, operator control 59 is also connected with the field control circuit of the generator 14 (interconnection not illustrated) to afford control of the voltage on lines 16 in response to operator demand. Thus, in the preferred embodiment, voltage control is a composite of the two controls noted. The control signals for both cycloconverters can be derived from a single "accelerator pedal" since the present invention automatically compensates for speed differences between the two motors exceeding a predetermined maximum amount. All of the foregoing is more fully explained hereinafter.

Speed difference regulation is provided in the following manner. A frequency subtractor 60 is provided an indication of the operating speed of induction motor 36 from tachometer 48 and an indication of the operating speed of induction motor 38 from tachometer 54. If the speed of operation of induction motor 36 exceeds the speed of operation of induction motor 38, subtractor 60 provides an output indication of the amount by which the speed of motor 36 exceeds the speed of motor 38. Otherwise, the subtractor 60 has a zero output. A frequency to voltage converter 62 processes the output from subtractor 60 by translating the frequency into a voltage having a calibrated amplitude. The gain of the frequency to voltage converter can be made variable to accommodate divers operating conditions such as sand, mud, etc. The voltage output from frequency to voltage converter 62 is connected with a voltage subtractor 64 where it is reduced by a calibrated amount set by an offset control 66. Offset control 66 determines the acceptable predetermined operating speed difference between the respective motors. Additionally, offset control 66 affords calibration to accommodate differences in wheel size as well as other operating considerations relevant to the front and rear sets of drive wheels. When the input from frequency to voltage converter 62 is less than the voltage of the offset control, the subtractor 64 provides a zero output. Subtractor 64 is connected with duty cycle control 56 to adjust the DC level of the modulation control signal to regulate the pulse width of rectangular voltage pulses supplied the motor 36. The resultant DC control signal is a composite of the control signals from operator control 59 and subtractor 64. In this manner, the voltage level of induction motor 36 is reduced when a signal is available from subtractor 64 and the reduction is determined by the amplitude of the available signal, all of which is described more completely hereinafter. Similar control for induction motor 38 is provided by duty cycle control 58 included in a control loop for induction motor 38 to regulate the voltage level supplied that motor. The speed difference control loop includes a frequency subtractor 68 connected with both tachometers 48 and 54 to provide an output signal only when the speed of motor 38 exceeds the operating speed of motor 36. The output frequency signal from subtractor 68 is processed by frequency to voltage converter 70 and connected with a voltage subtractor 72 where it is reduced by an amount determined by the setting of an offset control 74. The level of the offset control and the gain of the frequency to voltage converter are subject to operator or automatic adjustments depending on the particular application. The connection between subtractor 72 and duty cycle control 58 completes the requisite control to regulate the voltage supplied induction motor 38.

Reference should now be made to FIG. 2 wherein a frequency changer or cycloconverter of the type used to supply the windings of motors 36 and 38 of FIG. 1 is shown in greater detail. A prime mover driven alternator shown generally at 76 provides AC voltage and is similar to generator 14 of FIG. 1. Alternator 76 has three output windings 78, 80, and 82 providing three-phase voltage to the frequency changer, shown generally at 84, at a frequency substantially greater than the frequency desired for supply to the motor windings connected with the frequency changer output. As in FIG. 1, voltage regulation is provided for the alternator by a variable resistor 86 and a battery 88 serially connected with the field winding 90. This voltage regulation is merely exemplary, and in practice other known voltage regulator techniques could be substituted. The voltage level at the output of the alternator 76 is adjustable by the resistor 86 to augment the regulation of the frequency changer 84 to control the voltage supplied the induction motor. In operation, both modes of control are used to regulate the motor supply voltage; however, for the following discussion, the alternator is assumed to operate at a constant speed with a constant output voltage.

An AC induction motor 92 having three windings A, B, and C and a rotor 94 connected with a wheel 96 is supplied drive power by the frequency changer. The description of motor operation which follows is applicable to both motors 36 and 38 of FIG. 1 and their respective cycloconverters and controls. In FIG. 1, of course, the drive wheel 96 is replaced by a set of drive wheels. Additionally, the coupling connection 98 of FIG. 2 takes the form of a differential when a set of drive wheels is interconnected with the motor. It is noted that a single alternator provides input power to both frequency changers in FIG. 1.

Each of the windings A, B, and C of the motor 92 is supplied alternate positive and negative rectangular voltage pulses at an alternation repetition frequency determined by known slip frequency control techniques in the manner set forth above with respect to FIG. 1. In the drawing of FIG. 2, a tachometer 100, an adder 102, and a slip frequency control 103 provide the requisite sequential switching information to a gate control 105 which in turn gates conductive the respective controlled rectifiers of the frequency changer. The gate control 105 includes the duty cycle modulation control shown in FIG. 1 and discussed above to regulate voltage level and, in addition, includes speed difference regulation means of the type described to cause adjustments in pulse width according to the difference in operating speed of the two motors.

Each winding of the motor 92 is connected with two full-wave bridge rectifiers comprising twelve controlled rectifiers capable of providing both positive and negative voltage to the respective winding. For example, winding A is connected with six controlled rectifiers A+ which supply positive voltage to the winding A when all six A+ controlled rectifiers are gated conductive. Additionally, winding A is connected with six controlled rectifiers A− which supply negative voltage to the winding A when all six A− controlled rectifiers are gated conductive. Similarly, windings B and C are respectively connected with controlled rectifiers B+ and C+ and controlled rectifiers B− and C− to supply positive and negative voltages to the respective windings.

FIG. 3 depicts the resultant voltage to the motor windings A, B, and C during full voltage operation of the motor 92. Gate control 105 provides six output gate signals to sequentially and periodically gate the controlled rectifiers of the six full-wave bridge rectifiers including, respectively, controlled rectifiers A+, A−, B+, B−, C+, and C−. For example, the A+ output trigger simultaneously gates all six A+ controlled rectifiers and the A− output trigger simultaneously gates all six A− controlled rectifiers. In practice, a gate and cathode connection is required between each controlled rectifier and the gate control 105.

During full voltage operation, gate signals are provided the respective controlled rectifiers according to the gating system described in copending application Ser. No. 57,143, filed July 22, 1970, now U.S. Pat. No. 3,611,104 issued Oct. 5, 1971 in the name of Jalal T. Salihi et al, and entitled "Controlled Rectifier Triggering System." Basically, in the controlled rectifier triggering system of Ser. No. 57,143, a logic array (not illustrated) provides periodic and sequential enabling signals to initiate group gating pulses for application to the six controlled rectifiers of the respective full-wave bridge networks. To initiate a gate pulse for a particular group of controlled rectifiers comprising a full-wave bridge, a high frequency chopper provides a pulsating input to the primary winding of a transformer when a respective transistor switch is biased conductive in response to a logic control signal. The transformer is provided six secondary windings, one each for the six controlled rectifiers of the bridge group. Each secondary of the transformer is connected with a rectifier network and the resultant DC gate pulse is applied through a trigger circuit to the controlled rectifier connected with the particular secondary winding. Thus, it should be appreciated that the six controlled rectifiers of each full-wave bridge rectifier are gated during intervals in which the transistor control element associated with the primary windings of the transformer connected with the controlled rectifiers of that full-wave bridge is biased conductive. The times of the various gate signals are coextensive with the conductive time of the respective control transistors. Inasmuch as this summary is adequate for an understanding of the present invention, the remaining details of the controlled rectifier triggering system are not set forth nor illustrated herein and reference should be made to copending application Ser. No. 57,143 for the details of the entire circuit required. A voltage control system using the triggering of Ser. No. 57,143 in a duty cycle modulation control is disclosed in copending application Ser. No. 117,498, filed Feb. 22, 1971, now U.S. Pat. No. 3,659,168 issued Apr. 25, 1972 in the name of Jalal T. Salihi et al., and entitled "Voltage Control of a Motor Supply System." The system of U.S. Pat. No. 3,659,168 is shown generally in FIGS. 4, 5A, 5B, and 5C and is discussed below insofar as required for the present invention. Basically, the system of U.S. Pat. No. 3,659,168 modulates the conduction of the various transistor switches which determine the conductive states of the various full-wave bridge rectifiers to regulate the voltage output level available from the frequency changer.

Adder 102 of the drawing of FIG. 2 supplies pulses separated by 60° at the frequency of the voltage supplied the motor 92. All switching sequences of the frequency changer 84 are synchronized with these pulses and they, accordingly, can be viewed as defining frequency determining periods. During full voltage operation, as shown in FIG. 3, one new voltage pulse is initiated and one prior initiated voltage pulse is terminated (having completed 120°) at the end of each 60° of the voltage cycle. Voltage modulation is effected by fragmenting the frequency determining periods to create voltage amplitude determining periods and regulating the percentage "on time" for the respective voltages within relevant voltage amplitude determining periods.

Reference should now be made to FIG. 4 wherein a schematic block diagram of the control required to effect duty cycle modulation in the voltage amplitude determining periods is shown. The adder 102, as noted above, provides information regarding the repetition rate of the sequential switching of frequency changer controlled rectifiers. This adder information is provided by adders 46 and 52 in the vehicle electric drive of FIG. 1 for the respective cycloconverters 24 and 26. Slip frequency control is provided since the adder frequency is determined as a function of the speed of motor operation and a preselected slip frequency. The adder output on line 104 is shown in FIGS. 5A, 5B, and 5C and there denoted 104. This output is a series of pulses, spaced by 60°, defining frequency determining periods for the frequency changer. At a give frequency of operation, each pulse in the train 104 initiates a new period identical to all other periods.

A pulse oscillator 106 provides a constant frequency output on line 108 for connection to a frequency summer 110 where it is combined with the adder pulses from line 104. The pulse train on line 108 is shown in FIGS. 5A, 5B, and 5C as 108 and the pulse output from frequency summer 110 on line 112 is shown in the figures as pulse train 112. Oscillator 106 provides a fixed frequency output and it initiates a new cycle on the occurrence of each pulse on line 104. Thus, if the oscillator 106 has just produced on output pulse immediately prior to the occurrence of a pulse on line 104, a new cycle will be initiated by oscillator 106 without any output pulse resulting from the cycle in progress. The combined pulse output on line 112 is connected with a constant amplitude variable frequency sawtooth generator 114 to control the frequency of the sawtooth output available on line 116. A new sawtooth cycle is initiated by each pulse in the train 112. The resultant sawtooth waveform is shown in FIGS. 5A, 5B, and 5C as 116. It should be appreciated that this sawtooth generator 114 provides a sawtooth waveform ascending (in each full cycle) to a predetermined maximum value independent of the frequency of the sawtooth waveform; accordingly, the slope of the ramp is variable depending on the frequency of repetition. At the end of a frequency determining period, the sawtooth waveform terminates its then current cycle and initiates a new cycle at the outset of the subsequent frequency determining period though the ramp voltage failed to attain the predetermined maximum value. This sawtooth output is connected with a voltage comparator 118 where it is compared with a DC signal from a reference source of DC 120. The reference source is regulated in response to the operator control 122 and the speed difference control 124.

In the electric drive of FIG. 1, each of the cycloconverters is controlled by signals analogous to those developed by the operator control 122 and the speed difference control 124. Operator control 59 and subtractor 64 provide the analogous control signals to duty cycle control 56 to regulate modulation by cycloconverter 24. Operator control 59 and subtractor 72 provide the analogous control signals to duty cycle control 58 to regulate modulation by cycloconverter 26. The two control signals are united in the respective duty cycle controls 56 and 58 to develop a single DC control such as that available on the line 126 at the output of the reference source of DC 120 of FIG. 4.

The voltage on line 126 is shown in the timing diagrams of FIGS. 5A, 5B, and 5C as $V_{DC}$ (126) superposed on the sawtooth waveform 116. Comparator 118 has a high value output only when the instantaneous value of the sawtooth exceeds $V_{DC}$ (126); the comparator 118 has a low value output at all other times. The voltage available on line 128 at the output of voltage comparator 118 is shown in FIGS. 5A, 5B, and 5C where it is labelled 128.

In the operation of the duty cycle modulation voltage control, trigger signals can be supplied the frequency changer only if the output of voltage comparator 118 is at its high level; no group triggering of any full-wave bridge rectifier is possible when the output of voltage comparator 118 is at its low level. Thus, it should be appreciated that the voltage output of the frequency changer being controlled is reduced when the DC control signal $V_{DC}$ (126) is increased. This DC control signal is in turn regulated by both the operator control 122 and the speed difference control 124, making each of these controls effective to control the cycloconverter output voltage.

Adder 102 is connected with trigger logic 130 where a logic array develops sequential trigger signals of phase and extent such that the voltage pattern of FIG. 3 can be provided by the frequency changer. Thus, the logic defines exclusive intervals of conduction for the various full-wave bridge rectifiers of the frequency changer. The logic required and its operation is more completely described in Ser. No. 57,143. The respective conductive intervals set by the logic array are modulated to effect voltage control in accordance with the signal output from voltage comparator 118.

Voltage comparator 118 supplies an input to AND gate 132 to modulate the A+ group trigger signals. Trigger logic 130 provides two input signals to the AND gate 132 and, accordingly, the output from the AND gate has a high value only when all three inputs from the logic 130 and the comparator 118 are at a high value. Trigger logic 130 provides high value inputs to AND gate 132 during the times of A+ voltage pulses in each cycle of the operation of the frequency changer as shown in FIG. 3. These signals are modulated by the output from comparator 118 to determine the bias of transistor 134 which controls the connection of chopper 136 with trigger circuitry 138. A+ controlled rectifiers are gated only in the 0° to 120° intervals of each cycle and only when voltage comparator 118 has a high value during that interval. The resultant A+ trigger is shown in FIGS 5A, 5B, and 5C where it is denoted A+. Five similar regulation circuits are required to develop triggers A−, B+, B−, C+, and C−. The respective triggers are time displaced from each other, otherwise the operation and control described for the A+ triggers is applicable to all six.

FIGS. 5A, 5B, and 5C show operation at low, medium, and high frequency respectively. As the frequency is increased, the number of voltage amplitude determining periods within each frequency determining period continuously decreases. Finally, at high frequencies, as shown in FIG. 5C, the frequency determining periods and the voltage amplitude determining periods are coextensive. The foregoing, regarding voltage control, is more completely discussed in U.S. Pat. No. 3,659,168 including particular circuitry for oscillator 106 and sawtooth generator 114.

Each of the cycloconverters 24 and 26 of FIG. 1 is controlled by duty cycle modulation of the type described. Accordingly, wheel speed difference control is accomplished by regulating the DC control signals of the duty cycle controls. In this manner, by increasing the DC control voltage determining the duty cycle modulation of one of the cycloconverters 24 or 26, the voltage output from that cycloconverter is reduced and the speed of the motor energized by it is also reduced.

Although a particular preferred embodiment has been discussed in the foregoing, it should be understood that various changes in the preferred embodiment could be made within the scope of the appended claims.

What is claimed is:

1. A vehicle electric drive including a prime mover driven alternator supplying first and second AC to AC controlled rectifier frequency changers, comprising: front and rear sets of drive wheels, front and rear AC induction drive motors, front and rear differentials coupling said front and rear drive wheels respectively with said front and rear drive motors, means connecting said drive motors for energization respectively by said frequency changers, first and second slip speed control means connected respectively with said frequency changers and said motors to control frequency changer operating frequency and motor slip frequency, first and second sensing means coupled with said front and rear motors to continually sense motor operating speed, first and second voltage control means connected with both said first and second sensing means and respectively with said first and second frequency changers to reduce the voltage level of a respective frequency changer if the operating speed of the motor connected with said respective frequency changer exceeds by a predetermined amount the operating speed of the other motor to effect regulation of the difference in operating speeds of said front and rear sets of drive wheels.

2. A vehicle electric drive system, comprising: a prime mover driven alternator, first and second AC induction drive motors coupled through differentials respectively with the vehicle front and rear wheels, first and second AC to AC controlled rectifier frequency changers interconnecting said first and second drive motors respectively with said alternator, first and second control sources connected respectively with the controlled rectifiers of said first and second frequency changers to periodically and sequentially switch said controlled rectifiers, first and second sensing means connected respectively with the drive outputs of said first and second drive motors to continuously sense the operating speeds of said drive motors, first and second duty cycle control means coupled respectively with said first and second frequency changers to afford control of the voltage pulse widths applied said first and second drive motors, a first comparing means connected with both said first and second sensing means to provide a control signal only when said first motor is operating at a speed exceeding by at least a predetermined amount the speed of said second motor, means connecting said first comparing means with said first duty cycle control means to reduce the duty cycle of said first frequency changer reducing the power level and speed of said first motor when a control signal is available therefrom, a second comparing means connected with both said first and second sensing means to provide a control signal only when said second motor is operating at a speed exceeding by at least a predetermined amount the speed of said first motor, means connecting said second comparing means with said second duty cycle control means to reduce the duty cycle of said second frequency changer reducing the power level and speed of said second motor when a control signal is available therefrom, whereby control of the difference in operating speeds of the front and rear sets of wheels is effected.

* * * * *

PO-1050
(5/69)

UNITED STATES PATENT OFFICE
CERTIFICATE OF CORRECTION

Patent No. 3,713,504     Dated January 13, 1973

Inventor(s) Daniel W. Shimer and Jalal T. Salihi

It is certified that error appears in the above-identified patent and that said Letters Patent are hereby corrected as shown below:

Column 1, line 49, after "supplied" insert -- the motor operating at the higher speed is made to reduce its --.

Column 7, line 43, delete "give" and substitute -- given --;
line 55, delete "on" and substitute -- an --.

Signed and sealed this 3rd day of July 1973.

(SEAL)
Attest:

EDWARD M. FLETCHER, JR.
Attesting Officer

Rene Tegtmeyer
Acting Commissioner of Patents